United States Patent [15] 3,699,556

Aghazadeh [45] Oct. 17, 1972

[54] DIGITAL ENCODING SYSTEM WHEREIN INFORMATION IS INDICTED BY TRANSITION PLACEMENT

[72] Inventor: Shirzad Aghazadeh, Los Angeles, Calif.

[73] Assignee: The Singer Company

[22] Filed: April 30, 1971

[21] Appl. No.: 139,110

[52] U.S. Cl. ....................340/174.1 G
[51] Int. Cl. ....................G11b 5/06
[58] Field of Search..340/174.1 A, 174.1 G, 174.1 H

[56] References Cited

UNITED STATES PATENTS

| | | | |
|---|---|---|---|
| 3,573,770 | 5/1971 | Norris | 340/174.1 H |
| 3,323,115 | 5/1967 | Sims, Jr. | 340/174.1 H |
| 3,603,942 | 9/1971 | Heidecker | 340/174.1 G |
| 3,373,415 | 3/1968 | Gabor | 340/174.1 G |
| 3,164,815 | 1/1965 | Applequist | 340/174.1 H |
| 3,271,750 | 9/1966 | Padalino | 340/174.1 H |

*Primary Examiner*—Vincent P. Canney
*Attorney*—Linval B. Castle

[57] ABSTRACT

A digital, magnetic memory recording and demodulation system which doubles the bit density and thus the capacity of a memory using the phase modulation digital recording method. The normal "double pulse" phase modulation recording signal is divided so that the signal that is recorded on the magnetic medium contains a maximum of only one flux change per bit. The demodulation circuitry then senses the edges of the read-back signal, generates a self-clocking signal by the use of a bank of multivibrators that are preset to pulse for substantially one-quarter, three-quarter, one and one-quarter, and one and three-quarter bit time and, by gating the read-back signal with the self-clocking signal, reconstructs the original input signal.

6 Claims, 19 Drawing Figures

Figure 1:
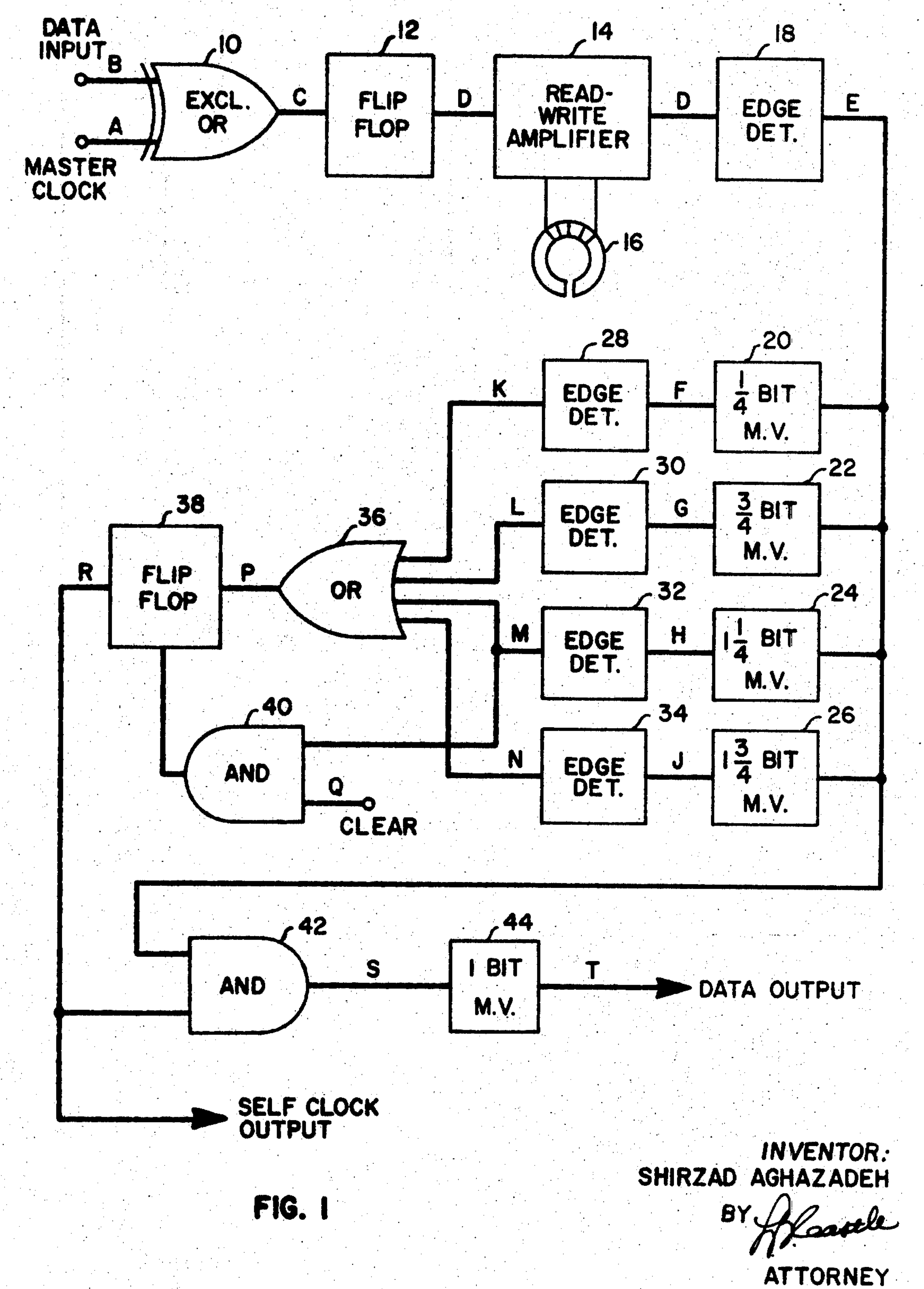

INVENTOR:
SHIRZAD AGHAZADEH
BY
ATTORNEY

INVENTOR:
SHIRZAD AGHAZADEH
BY [signature]
ATTORNEY

DIGITAL ENCODING SYSTEM WHEREIN INFORMATION IS INDICTED BY TRANSITION PLACEMENT

BACKGROUND OF THE INVENTION

All digital computing equipment requires some type of memory storage, and most of the present day computer memories store the data in binary form on moving magnetic mediums, such as a magnetically coated tape, drum, or rotating disc. Because they are unlimited in length, tape memories have a very large storage capacity potential but are considered comparatively slow because of the time required to search for particular data along the length of the tape. Disc and drum memories have very fast access to the data because, as the disc or drum rotates, the data passes under the transducer at each revolution. However, disc or drum memories have a limited capacity depending upon the number of tracks of data, the length of the tracks, and the bit density of recorded data in the tracks. In order to obtain the maximum storage capacity from a given size rotatable memory, it is necessary to select an efficient data recording system.

The simplest magnetic recording method is commonly referred to as the "return to bias" method, which records on the magnetic medium a pulse representing a binary "1" and the lack of a pulse representing a binary "0". Although a simple and inexpensive system, this method of recording is not widely used because the two flux changes required for recording each bit produces a relatively slow recording system and also because the absence of any recording represents a binary "0" and thus may result in readout error.

The possible errors introduced by the lack of a signal being read as a binary "0" is overcome by a recording system referred to as the "return to zero" method of recording, in which a binary "1" is represented by a recorded pulse of one polarity and a binary "0" by a pulse of the opposite polarity. While solving the problem of possible readout error, from lack of signal, this method of recording is relatively slow and not widely used because it is, again, a double transition method requiring two flux changes per recorded bit.

A system which apparently obviates all of the disadvantages referred to above is the "non-return to zero" (NRZ) method, which is fast in that there is a maximum of one flux change per bit, i.e., the transducer current switches only when a binary "1" is recorded. Although very popular, this NRZ method has its disadvantages. Because there is not always an output for each bit sensed by the transducer, the method is not self-clocking and it is, therefore, necessary to record a clock track along with the data tracks. Furthermore, the method is subjected to amplitude dependent time errors, that is, since data is contained only in flux changes, the amplitude of the read-back signal will vary with the data pattern. Another problem of NRZ recording is associated with the existence of high frequency noise at the baseline of the signal in patterns that contain fewer flux changes. The existence of this type of noise increases the error probability and the necessary complexity of the read amplifier design.

Still another method of recording is known as "phase modulation recording" in which the recording current wave form consists of a series of complete cycles, a "1" differing from a "0" only in phase. Although phase modulated signals require a maximum of two flux changes per bit, it is possible to record by this method at a very high rate and at bit densities approaching that of the NRZ method of recording. Furthermore, since there is an output signal for each recorded bit, this system can be made self-clocking and the output information can be correctly interpreted without the necessity of a separately recorded clock signal, as is required in the NRZ method.

This invention provides a method and circuitry that will double the bit density of a phase modulated data signal and, therefore, the memory capacity of a magnetic recording medium.

BRIEF DESCRIPTION OF THE INVENTION

Briefly described, the invention is a digital recording and demodulation system comprising circuitry that accepts a binary input signal, converts it into a phase modulation double pulse signal, and then modifies that signal into a single pulse signal which may be recorded at high bit densities. The original input signal is reconstructed in the demodulation circuitry by first shaping and amplifying the playback signal read by the magnetic transducer, detecting the edges of the shaped signal, and then gating those edges with a self-clocking signal. The self-clocking signal is generated by detecting the downgoing edges of the output wave forms produced by a bank of multivibrators adjusted to trigger at approximately one-quarter, three-quarter, one and one-quarter, and one and three-quarter bit times, respectively.

Figure 2A:
Figure 2B:
Figure 2C:
Figure 2D:
Figure 2E:
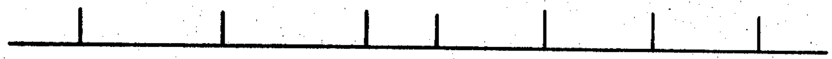
Figure 2F:
Figure 2G:
Figure 2H:
Figure 2J:
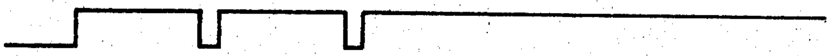
Figure 2K:
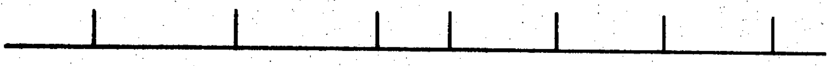
Figure 2L:
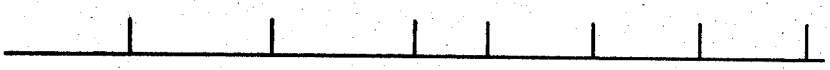
Figure 2M:
Figure 2N:
Figure 2P:
Figure 2Q:
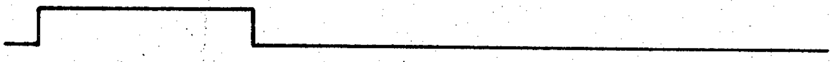
Figure 2R:
Figure 2S:
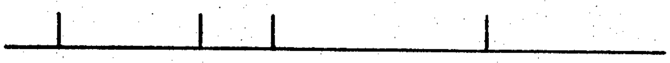
Figure 2T:

In the drawings which illustrate a preferred embodiment of the invention:

FIG. 1 is a block diagram of the recording and demodulation circuitry of the invention; and FIG. 2 consisting of FIGS. 2A through 2R is an illustration of typical wave forms appearing at various points in the block diagram circuitry illustrated in FIG. 1.

It is to be noted that the block diagram of FIG. 1 makes use of capital letters at the output terminals of each block in the diagram. These letters refer to correspondingly identified wave forms in FIG. 2. Therefore, referring to both FIGS. 1 and 2 of the drawings, an externally generated square wave master clock signal A and a binary data input signal B are introduced into an Exclusive OR gate 10, which produces an output signal when there is an input signal at either one, but not both, of its input terminals. It will be noted that in the divided signals shown in wave form D, a binary "1" is represented by one midbit transition; that is, there is a transition when there is a reversal in the clock signal A at the midpoint in any binary "1" signal in the input data wave form B. On the other hand, a binary "0" is represented by the absence of the transition in the case of a single "0", but with a transition at the beginning of each bit between contiguous binary "0's". As shown in curve B of the FIG. 2, the data input to gate 10 is arbitrarily selected as the binary number "10101100100' '. As will subsequently be explained in connection with wave form R generated by the demodulation circuitry, the first two input bits, "1" "0", are considered a preamble to be followed by the actual data bits.

The output signal from Exclusive OR gate 10 is shown in wave form C of FIG. 2 and is the phase modulation representation of the data contained in wave form B. It can be seen in wave form C that a binary "1" is represented by a signal having a high portion followed by a low portion; the binary "0" signal has a low portion followed by a high portion. The phase modulation representation of alternating bits such as "1010" has only one transition per bit which, upon recording, would be one magnetic flux change per bit. However, the phase modulation representation of non-alternating bits, such as "11" or "00" can be seen in wave form C to have two transitions and flux changes per bit. The packing density of a moving magnetic medium and therefore the capacity of the magnetic memory is limited by the number of flux changes per unit length. Thus, the bit packing density and the capacity of a memory can be doubled if the same data can be recorded with only half as many flux changes per unit length. Accordingly, the phase modulation signal C from Exclusive OR gate 10 is applied to flip-flop 12 which divides the phase modulation wave form C to produce the recording current as shown in wave form D. Flip-flop 12 may be a JK flip-flop with the J and K terminals connected to the clock input so that the flip-flop switches only when its input signal C drops from a "1" to "0". This modified phase modulation signal D is then applied to a read-write amplifier 14 and the signal is recorded by transducer 16.

The recorded signal is demodulated by first reading the magnetic medium with transducer 16 and applying the signal to read-write amplifier 14. Read-write amplifier 14 contains the necessary circuitry well known in the art to convert the current signal from transducer 16 into a square wave output, as illustrated in wave form D of FIG. 2. This signal is then introduced to an edge detector 18 which senses all transitions of the read amplifier signal D and produces a series of very narrow pulses E corresponding to those signal transitions. To distinguish very narrow pulses from pulses having a significant width, the very narrow pulses will be referred to as spikes. Hence, edge detector 18 generates spikes E corresponding to the transitions of pulses D.

In order to reconstruct the wave form of the original input data, it is first necessary to generate a clock signal. Accordingly, the spikes E from edge detector 18 are introduced into a parallel bank of four retriggerable monostable multivibrators 20, 22, 24 and 26. Multivibrator 20 has been previously adjusted to produce a square wave pulse of substantially one-quarter bit time; that is one-quarter of a full cycle of the master clock signal A of FIG. 2. Multivibrator 22 has been adjusted to produce a pulse of three-quarter bit time; multivibrator 24 produces a pulse of one and one-quarter bit time; and multivibrator 26 produces a pulse of one and three-quarter bit time. The output signals from multivibrators 20, 22, 24 and 26 are shown in FIG. 2 in wave forms F, G, H and J, respectively, and these signals are introduced to edge detectors 28, 30, 32 and 34, respectively, each of which detects only the downgoing edges of the signals applied to the input. Accordingly, edge detectors 28, 30, 32 and 34, respectively, produce spikes K, L, M and N of FIG. 2. Spikes K, L, M and N are applied to OR gate 36, which produces output spikes P, the spacing of which correspond to substantially one-half cycle of clock time. In order to generate a useable self-clocking signal, these spikes P are applied to a flip-flop 38, which is preferably a JK flip-flop with the J and the K terminals connected to the input clock terminal so that the flip-flop will change state coincidentally with the arrival of each input spike P.

It is important that flip-flop 38 produce a properly phased output signal, otherwise there will be an erroneous reconstruction of the original data input signal at the output terminal of the demodulator. Therefore, flip-flop 38 must be forced into its low state at the appropriate time at the beginning of recording of each data block. When a data block is to be recorded, it is first necessary to apply a "clear" signal Q, which may be two or three data bits in length, to one input terminal of an AND gate 40, the second input terminal of which is connected to the output of edge detector 32. It can now be understood why it is necessary to provide a preamble such as a "1" followed by a "0" before the data information is recorded into the system. A preamble of a "1" and "0" assures the presence of a spike in the proper position in the train of spikes M which, when gated with the "clear" signal Q in AND gate 40, produces an output signal to the reset terminal of flip-flop 38. This signal at the reset terminal forces the flip-flop into its low or false state at a point corresponding to the presence of the first spike M from edge detector 32. Therefore, the first transition in the output signal R of flip-flop 38 is a downward going signal corresponding to the spike from edge detector 32 that was generated as a result of the preamble signal originally applied to the input data terminal of gate 10.

The properly phased self-clock output pulses R generated in flip-flop 38 are applied to AND gate 42 along with the spikes E from edge detector 18 to produce output spikes S. It will be noted in comparing the spikes E and self-clock R that the spikes E always appear near the center or peak of the self-clock wave form R, and not near a transition point. This is, of course, due to the fact that the self-clocking signal was generated from spikes K, L, M and N that are generated at the odd quarter-bit points following the spikes E. It will also be noted that some of the spikes E are not carried down to the output spikes S because they failed to pass through AND gate 42 at the proper self-clock timing position.

Output spikes S produced by AND gate 42 are applied to the input terminal of a retriggerable monostable multivibrator 44 which has been preadjusted to switch at one bit time. Accordingly, upon the arrival of each input spike, multivibrator 44 produces an output pulse of one bit length as shown in wave form T. It will be noted that the wave form T of FIG. 2 corresponds precisely with the input data wave form B less the preamble bits "1" and "0". The circuitry has faithfully reproduced the original input data after having divided the signal at flip-flop 12 so that the recorded data contained no more than one flux change per bit. It can, therefore, be appreciated that the recorded data in wave form D can be stored at twice the bit density of the original input data in wave form B. Such an increased density doubles the storage capacity of the magnetic memory.

What I claim is:

1. A digital magnetic recording method comprising the steps of: gating master clock signals with digital input data signals to convert said input data signals into phase modulated data signals;

dividing said phase modulated data signals into modified signals that change state upon alternate changes of state of said phase modulated data signals;

said modified signals having a midbit transition to represent a binary "1", and a transition at the beginning of a bit between contiguous binary "0's" in the input data signals to represent a binary "0"; and magnetically recording said modified signals.

2. The digital recording method claimed in claim 1 further including the steps of:

reading and shaping the recorded signals into substantially square wave signal pulses corresponding to said modified signals;

producing edge detector spike signals at points corresponding to the edges of said square wave signal pulses;

generating from said edge detector spike signals self-clocking signals substantially corresponding to said master clock signals;

gating said edge detector spike signals with said self-clocking signals to produce output spike signals when the polarity of said output spike signals corresponds with that of said self-clocking signals; and converting each of said output spike signals into output pulses of one bit time in length, said output pulses representing binary data identical with that in corresponding portions of said digital input signal.

3. The digital recording method claimed in claim 2 wherein the step of generating self-clocking signals includes the steps of:

generating timing pulses having lengths substantially corresponding to one-quarter, three-quarters, one and one-quarter, and one and three-quarters of a cycle of said master clock signal, each of said timing pulses having its leading edge corresponding in time with each of said edge detector spikes;

producing a plurality of timing spikes each corresponding in time to the downgoing edges of at least one of said timing pulses; and developing substantially square wave self-clocking signals having transition points corresponding to said timing spikes.

4. A digital data recording circuit comprising:

gating means responsive to a master clock signal and a binary data input signal for generating a first alternating signal having a cycle of one phase representing a binary "1" and a cycle of the opposite phase representing a binary "0";

dividing means coupled to said gating means and responsive to said first alternating signal for generating a second alternating signal having a frequency of one-half that of said first alternating signal;

said second alternating signal having midbit transitions representing a binary "1", and transitions at the beginning of bits between contiguous binary "0's" of the input signal representing a binary "0";

recording means for recording and for reading and shaping said second alternate signal;

an edge detector coupled to the output of said recording means and responsive to said second alternate signal for producing data spike signals at points corresponding in time to the edges of said shaped second alternate signal;

clock circuitry coupled to said edge detector and responsive to the data spike signals for generating a self-clocking signal having a frequency corresponding to said master clock signal;

gating circuitry coupled to said clock circuitry and to said edge detector for producing output spike signals when the polarity of said self-clocking signal corresponds to that of the data spike signals; and pulse generating means coupled to said gating circuitry for generating output pulses of one bit in width upon receipt of each output spike signal.

5. Recording circuitry claimed in claim 4 wherein said clock circuitry comprises:

a bank of first, second, third and fourth multivibrators coupled to said edge detector and preadjusted to produce output pulses respectively having widths of substantially one-quarter, three-quarters, one and one-quarter, and one and three-quarters of one cycle of said master clock signal upon receipt of each data spike signal;

first, second, third and fourth edge detectors respectively coupled to each of said first, second, third and fourth multivibrators for generating timing spikes at points corresponding in time to the downgoing edges of each output pulse from said multivibrators;

and AND gate coupled to the output of each of said edge detectors; and a flip-flop coupled to the output of said AND gate said flip-flop adapted to change state upon the arrival of each timing spike from said AND gate for generating a substantially square wave clocking signal substantially corresponding to the master clock signal.

6. The recording circuitry claimed in claim 5 further including means coupled to the reset terminal of said flip-flop and responsive to an externally applied clearing signal and the first timing spike signal from the third edge detector for forcing said flip-flop into a predetermined phase for generating self-clocking signals.

* * * * *